A. HUNERWADEL.
MECHANICAL MOVEMENTS.

No. 185,926.  Patented Jan. 2, 1877.

UNITED STATES PATENT OFFICE.

ADOLF HUNERWADEL, OF WASHINGTON, DISTRICT OF COLUMBIA.

IMPROVEMENT IN MECHANICAL MOVEMENTS.

Specification forming part of Letters Patent No. 185,926, dated January 2, 1877; application filed August 8, 1876.

*To all whom it may concern:*

Be it known that I, ADOLF HUNERWADEL, of Washington city, District of Columbia, have invented a new and Improved Mechanical Movement; and I do hereby declare that the following is a full, clear, and exact description of the same, reference being had to the accompanying drawing, forming part of this specification, in which—

Figure 1:
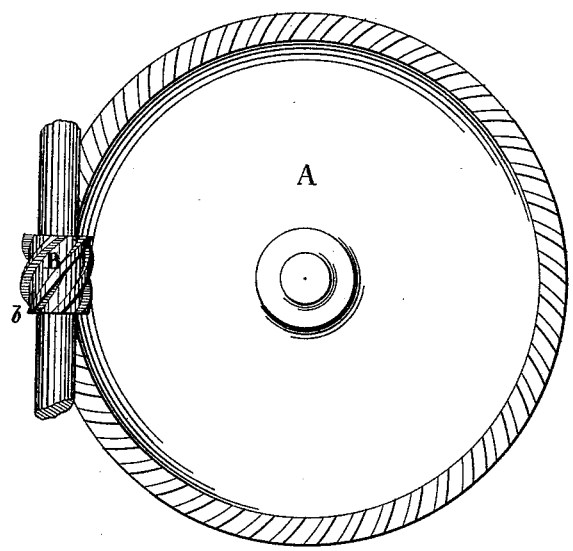
Figure 2:
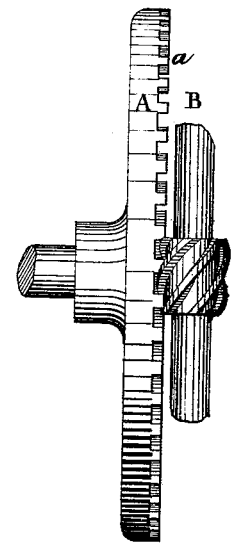

Figure 1 is a side elevation; Fig. 2, an end elevation.

The invention relates to the transmission of power through a crown and a worm wheel gear, so as to lose the smallest portion thereof by friction, and consists in obliquing the spurs of the crown-wheel so that they will stand at an angle to the radius instead of being in line therewith, thus being enabled to impinge upon the spiral ribs of the worm-wheel at a very acute angle.

A represents a crown-wheel, rotating so as to work the worm-wheel B. The former has, upon one side of its rim, the spurs *a*, arranged so that, if extended, they would form chords of the circle of wheel, and, of course, be at an angle to the radius instead of being radial in their direction, as is ordinarily the case. These oblique teeth will impinge upon the spiral worm-threads *b* at a very small angle, thus, to a great extent, nullifying the large amount of friction that has been hitherto so objectionable in ordinary worm-gear.

In worm-gear in which the spur-wheel is in the same plane with the worm, there is a leverage or lateral pressure against the edge of the spur-wheel proportioned to the force required for the one to rotate the other. This leverage necessarily increases the friction of the shaft of the spur-wheel in its bearings, and thus a considerable amount of the power applied to the gearing is lost or uselessly expended. In my invention this cannot occur, for the reason that the force applied is measured by, and is in the form of pressure between, the teeth of the worm and spur wheel, and is exerted in the plane parallel to it, so that the leverage is very slight, and the additional friction, due to lateral pressure between the spur-wheel shaft and its bearings, is inappreciable or immaterial.

My invention also differs from the combination of a worm-shaft with that form of crown-wheel having cylindrical teeth. The form of the teeth of my improved crown-wheel is such that they conform to the shape of the spiral flanges of the worm and bear upon a considerable extent of their length. The friction is, therefore, very slight, and the least power is lost in transmission and acceleration of the motion from the wheel to the worm.

Having thus described my invention, what I claim as new is—

The crown-wheel A, having fixed teeth, curved as shown and described, in combination with the worm B, to operate as specified.

The above specification of my invention signed by me this 4th day of August, 1876.

ADOLF HUNERWADEL.

Witnesses:
SOLON C. KEMON,
CHAS. A. PETTIT.